United States Patent [19]

Yokohama

[11] Patent Number: 5,295,201
[45] Date of Patent: Mar. 15, 1994

[54] ARRANGEMENT OF ENCODING MOTION IMAGE SIGNALS USING MOTION COMPENSATION AND ORTHOGONAL TRANSFORMATION

[75] Inventor: Yutaka Yokohama, Tokyo, Japan
[73] Assignee: NEC Corporation, Tokyo, Japan
[21] Appl. No.: 6,406
[22] Filed: Jan. 21, 1993
[51] Int. Cl.⁵ .............................................. G06K 9/20
[52] U.S. Cl. ....................................... 382/48; 382/21; 382/41; 348/416
[58] Field of Search ................... 382/48, 1, 41, 21, 22; 358/105, 133, 136, 103, 108; H04N 7/18

[56] References Cited

U.S. PATENT DOCUMENTS

| | | | |
|---|---|---|---|
| 4,827,532 | 5/1989 | Gloomstein | 382/41 |
| 5,157,732 | 10/1992 | Ishii et al. | 382/1 |
| 5,173,771 | 12/1992 | Kitazato | 358/105 |
| 5,173,772 | 12/1992 | Choi | 358/105 |
| 5,177,794 | 1/1993 | Abe et al. | 382/48 |

Primary Examiner—Joseph Mancuso
Attorney, Agent, or Firm—Sughrue, Mion, Zinn, Macpeak & Seas

[57] ABSTRACT

A plurality of frame image signals are successively applied to an image signal encoder. A motion region of an incoming frame image signal is extracted and then approximated in shape to a polygon. The vertices of the polygon are determined and then the coordinate values of the vertices are calculated and transmitted. Further, in the event that the incoming image signal includes a region which is required to undergo orthogonal transformation, the region are extracted and then divided into a plurality of small regions. Following, each of the divided small regions is approximated in shape to a polygon and then the vertices thereof are detected. Subsequently, the coordinate values of the vertices are calculated and then transmitted. Consequently, the data to be transmitted can effectively be reduced.

4 Claims, 4 Drawing Sheets

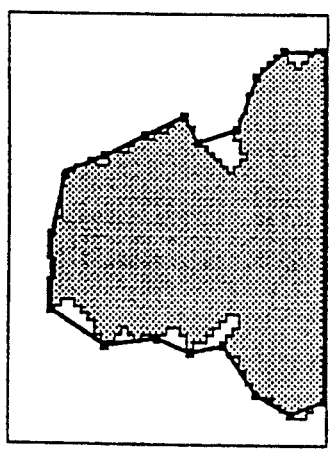
FIG. 2(B)
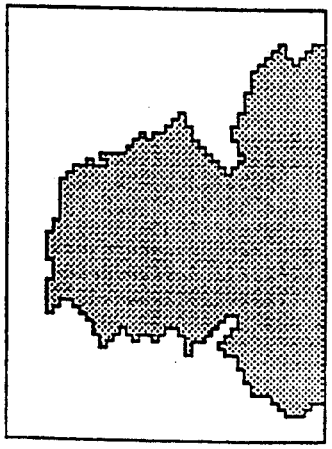
FIG. 2(A)
FIG. 2(C)
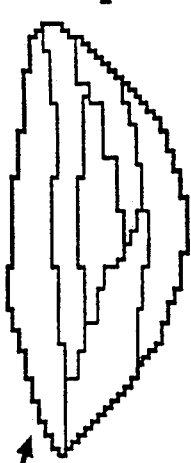
FIG. 2(E)
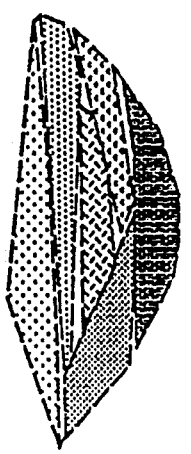
FIG. 2(F)
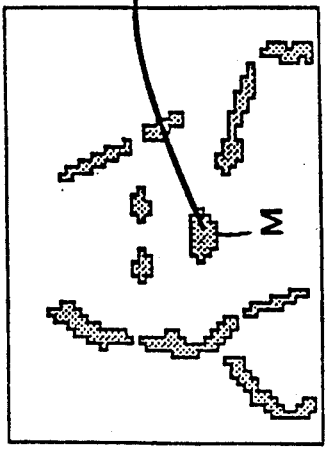
FIG. 2(D)
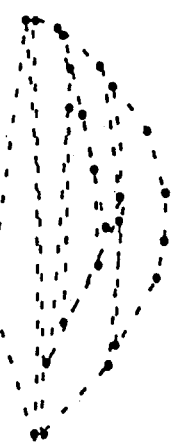
FIG. 2(G)

ARRANGEMENT OF ENCODING MOTION IMAGE SIGNALS USING MOTION COMPENSATION AND ORTHOGONAL TRANSFORMATION

BACKGROUND OF THE INVENTION

1. Field of the Invention

The present invention relates generally to an arrangement of encoding motion image signals, and more specifically to such an arrangement wherein a motion region is extracted from an incoming image signal and is used to predict motion compensation and wherein a region to be orthogonally transformed is extracted and undergoes orthogonal transformation.

2. Description of the Prior Art

Digital image encoding has found effective applications ranging from medial imagery, remote sensing up to image communication such as video conference and picture telephone.

Many approaches to effectively encoding motion image signals consecutively applied have been proposed, one of which is discussed in a paper entitled "Coding of arbitrarily shaped image segments based on a generalized orthogonal transform" by Michael GILGE, et al, Signal Processing: Image Communication 1 (1989), pages 154–180, issued by Elsevier Science publishers B.V.

According to this prior art, arbitrarily shaped regions, each of which exhibits a large motion compensated prediction error, are extracted and then subject to orthogonal transformation depending on the shapes theroef.

In more specific terms, each of frame images applied to an encoder is divided into a plurality of grids irrespectively of the content of the image. Following this, motion vectors are derived using so called "block, matching" techniques. The motion vectors are used to motion compensate a preceding frame image and thus, a current frame image is predicted. Throughout the instant disclosure, a "current frame image" implies an incoming frame image.

Subsequently, the regions each of which exhibits a large amount of motion compensated prediction error, are extracted from the current image signal after comparing the predicted image with the current frame image. Thereafter, the region is subject to orthogonal transformation depending on the shape thereof using a base function. After the contour of the region is determined, encoded are the motion vectors and the contours and the conversion coefficients of the orthogonal transformation.

However, the above mentioned prior art encodes the contours using chain codes and hence this prior art has encountered the problem in that a very large amount of information should be transmitted.

SUMMARY OF THE INVENTION

It is an object of the present invention to provide an arrangement of effectively reducing the information to be transmitted by approximating in shape a motion region to a polygon.

Another object of the present invention is to provide an arrangement of effectively reducing the information to be transmitted by approximating in shape a region to be orthogonally transformed to a polygon.

An aspect of the present invention comes in an arrangement of encoding a plurality of image signals successively applied thereto, said arrangement comprising: first means for storing a first image signal; second means which is coupled to said first means and extracts a motion region included in a second image signal by comparing said first and second image signals, said second image signal having been applied to said arrangement immediately after said first image signal; third means which is coupled to said second means and approximates in shape said motion region to a first polygon and extracting vertices of said firsts polygon and calculating coordinate values of said vertices, said third means generating first information indicative of said coordinates values from said arrangement; fourth means which is arranged to receive said first and second image signals and a signal indicative of said first polygon, said fourth means generating motion parameters and a predicted image signal, said motion parameters being derived from said arrangement; fifth means which is arranged to compare said predicted image signal and said second image signal, said fifth means extracting, from said second signal, a first region which is required to be orthogonally transformed; sixth means which is arranged to receive said first region and said second image signal, said sixth means dividing said first region into a plurality of second regions; seventh means, coupled to said sixth means, for approximating in shape each of said second regions to second polygons and extracting vertices of each of said second polygons and calculating coordinate values of said vertices of each of said second polymers, said seventh means generating second information indicating said coordinate values of said vertices of each of said second polygons, said second information being derived from said arrangement.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIGS. 2(a)–2(g) are sketches for discussing the operations which characterize the present invention.

DETAILED DESCRIPTION OF THE PREFERRED EMBODIMENTS

Figure 1:
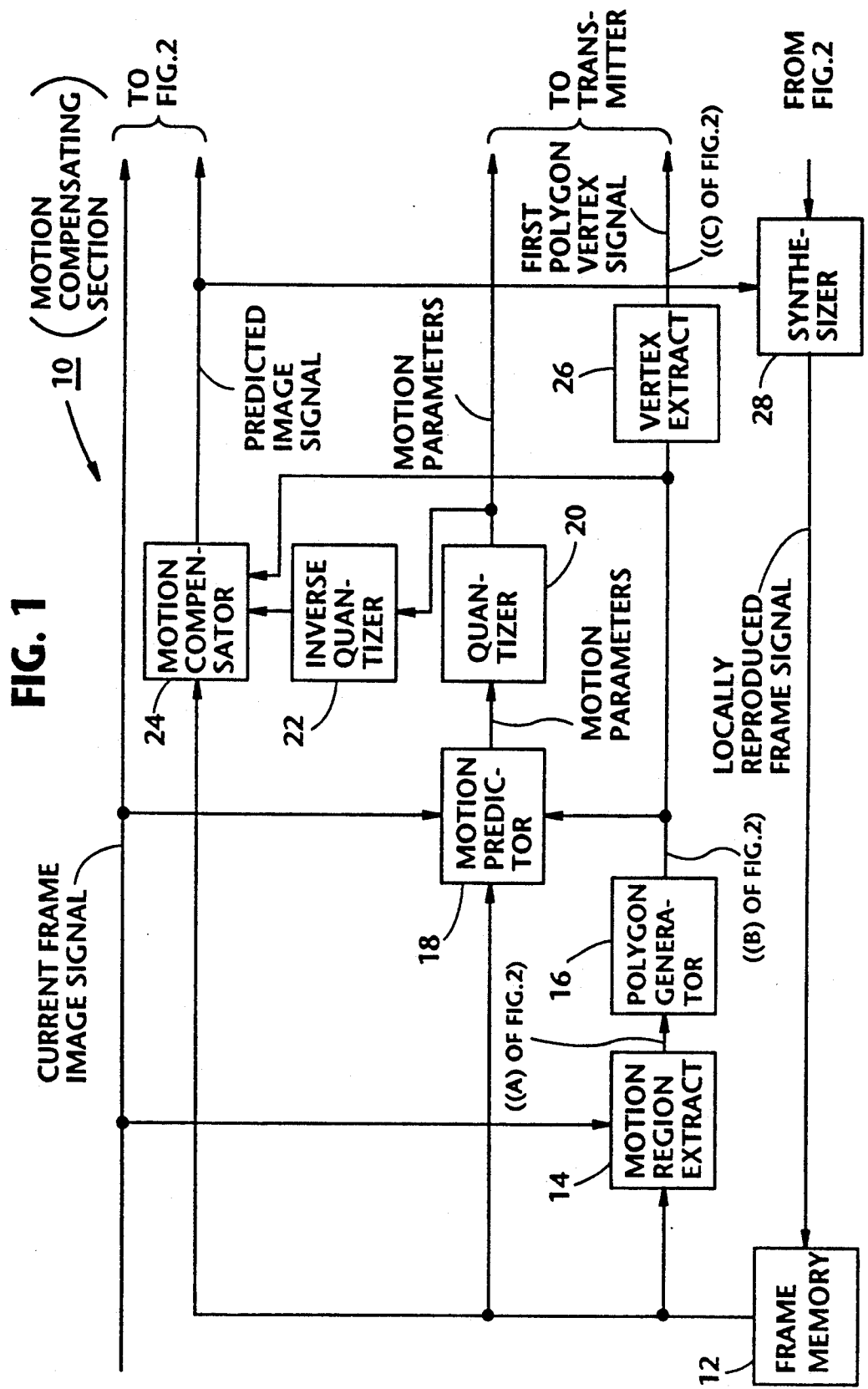
FIG. 1 is a block diagram schematically showing a motion compensating section which forms part of an image signal encoder of the present invention.

Reference is now made to FIGS. 1 and 2. FIG. 1 is a block diagram which shows a motion compensating section of an encoder of the present invention. FIG. 2 shows sketches (A)–(F) for describing the operations of the arrangement of FIG. 1. FIG. 2 is also referred to when discussing the arrangement of FIG. 2.

In FIG. 1, a motion compensating section 10 includes a frame memory 12 which serves to store a frame image signal which precedes an incoming frame image signal and has been locally reproduced. A motion region extractor 14 is supplied with the frame image signal from the frame memory 10 and a current (viz., incoming)

frame image signal. The motion region extractor 14 compares the two frame image signals applied thereto and extracts a motion region from the current frame image signal. An example of such a motion region is shown by the sketch (A) of FIG. 2.

A polygon generator 16 receives, from the motion region extractor 14, the motion region included in the current frame image signal and generates a polygon which approximates in shape to the motion region and which is shown by bold lines in the sketch (B) of FIG. 2. A motion predictor 18 receives a signal indicating the polygon, the current frame image signal, and the preceding frame image signal. The motion predictor 18 generates motion parameters which are subject to quantization at a quantizer 20. The quantized motion parameters are applied to a transmitter (not shown). Further, the quantized motion parameters are inversely quantized at an inverse quantizer 22 whose output is applied to a motion compensator 24.

The motion compensator 24 is further supplied with the preceding frame image signal from the memory 12, and the polygon indicating signal from the polygon generator 16. Thus, the motion compensator 24 is able to produce a predicted image signal which predicts the current frame image signal. The predicted image signal is applied to the arrangement of FIG. 3.

On the other hand, a polygon vertex extractor 26 receives the polygon indicating signal from the generator 16 and determines the coordinates values of the vertices which are shown by a plurality of dots in the sketch (C) of FIG. 2. The vertex extractor 26 further encodes the coordinate values obtained and applies same to the transmitter (not shown) as a first polygon vertex signal.

Figure 3:
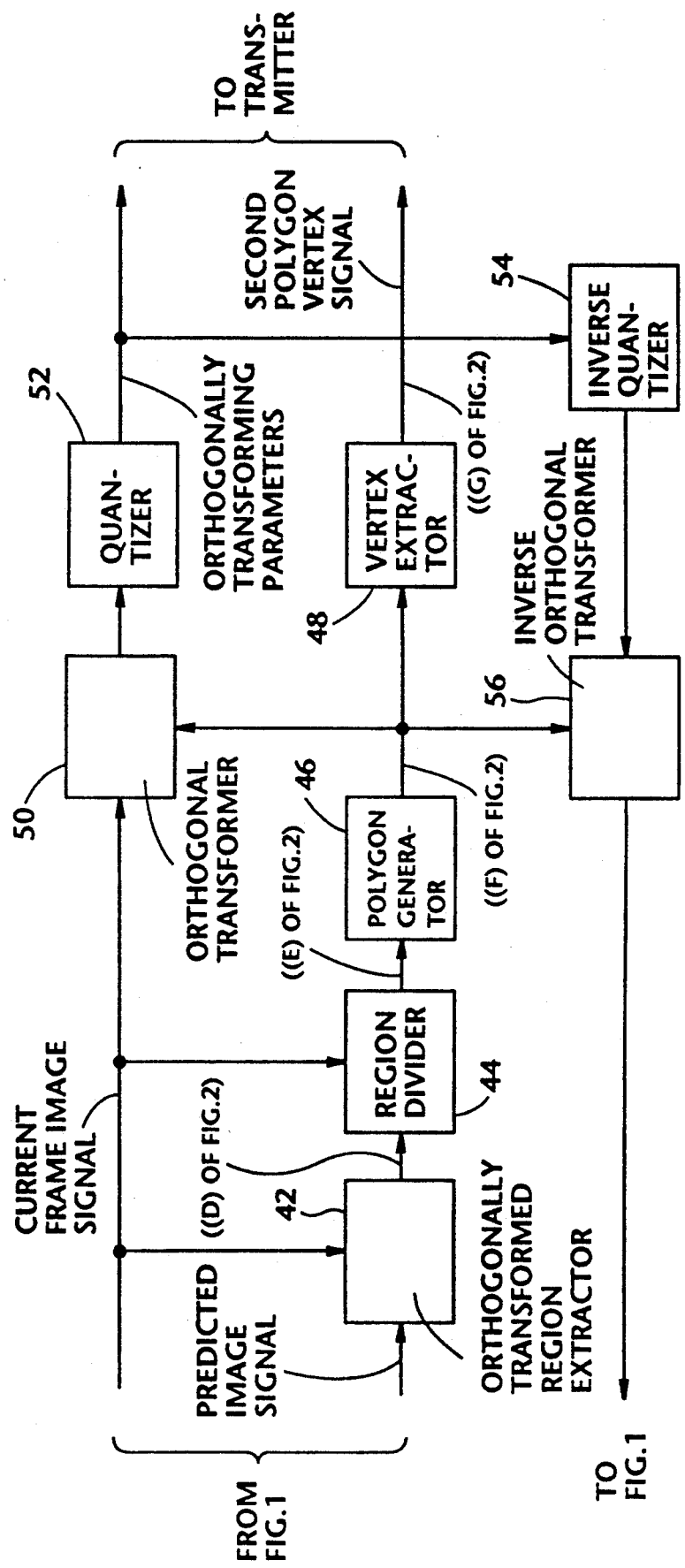
FIG. 3 is a block diagram schematically showing an orthogonal transforming section which forms part of an image encoder of the present invention.

FIG. 3 is a block diagram schematically showing an orthogonally transforming section 40 which forms part of the encoder of the present invention in combination with the arrangement of FIG. 1.

In FIG. 3, an orthogonally transformed region extractor 42 receives the current frame image signal and the predicted image signal both of which are applied from the arrangement of FIG. 1. Subsequently, the extractor 42 compares the two signals applied thereto and extracts one or more regions to be orthogonally transformed each of which exhibits a large prediction error. The regions thus extracted by the extractor 42 are schematically illustrates in the sketch (D) of FIG. 2 wherein only a region M will be selected in the following sketches (E), (F) and (G) of FIG. 2 for the sake of simplifying the drawing. A region divider 44 divides each of the extracted regions into a plurality of small regions depending on the content of the current frame image signal. The sketch (E) of FIG. 2 shows a plurality of small regions which are determined by dividing the region M.

The small regions thus obtained are applied to a polygon generator 46 which outputs a signal indicating a plurality of polygons each of which approximates in shape to the corresponding small regions shown in the portion (F) of FIG. 2. A polygon vertex extractor 26 receives the output of the polygon generator 26 and determines the coordinate values of the vertices of each of the small polygons. These vertices are shown by dots in the sketch (G) of FIG. 2. The extractor 48 further encodes the coordinate value of each of the vertices and applies same to the transmitter (not shown) as a second polygon vertex signal.

An orthogonal transformer 50 receives the output of the polygon generator 46 and the current frame image signal, and determines "transforming bases" of the data within each of the polygons (viz., pixel data) depending on the shape thereof. Following this, the orthogonal transformer 50 orthogonally transforms the data within the polygons using the transforming bases, and then generates a plurality of orthogonally transforming parameters which are applied to the transmitter (not shown) and also to an inverse quantizer 54. An inverse orthogonal transformer 56 receives the outputs of the polygon generator 46 and the inverse quantizer 54, and generates the data within the regions.

Returning to FIG. 1, a synthesizer 28 is supplied with the data outputted from the inverse orthogonal transformer 56 (FIG. 3) and the predicted image signal. Thus, the synthesizer 28 generates a locally reproduced frame signal which is stored in the frame memory 12 and utilized in the next frame image encoding.

Figure 4:
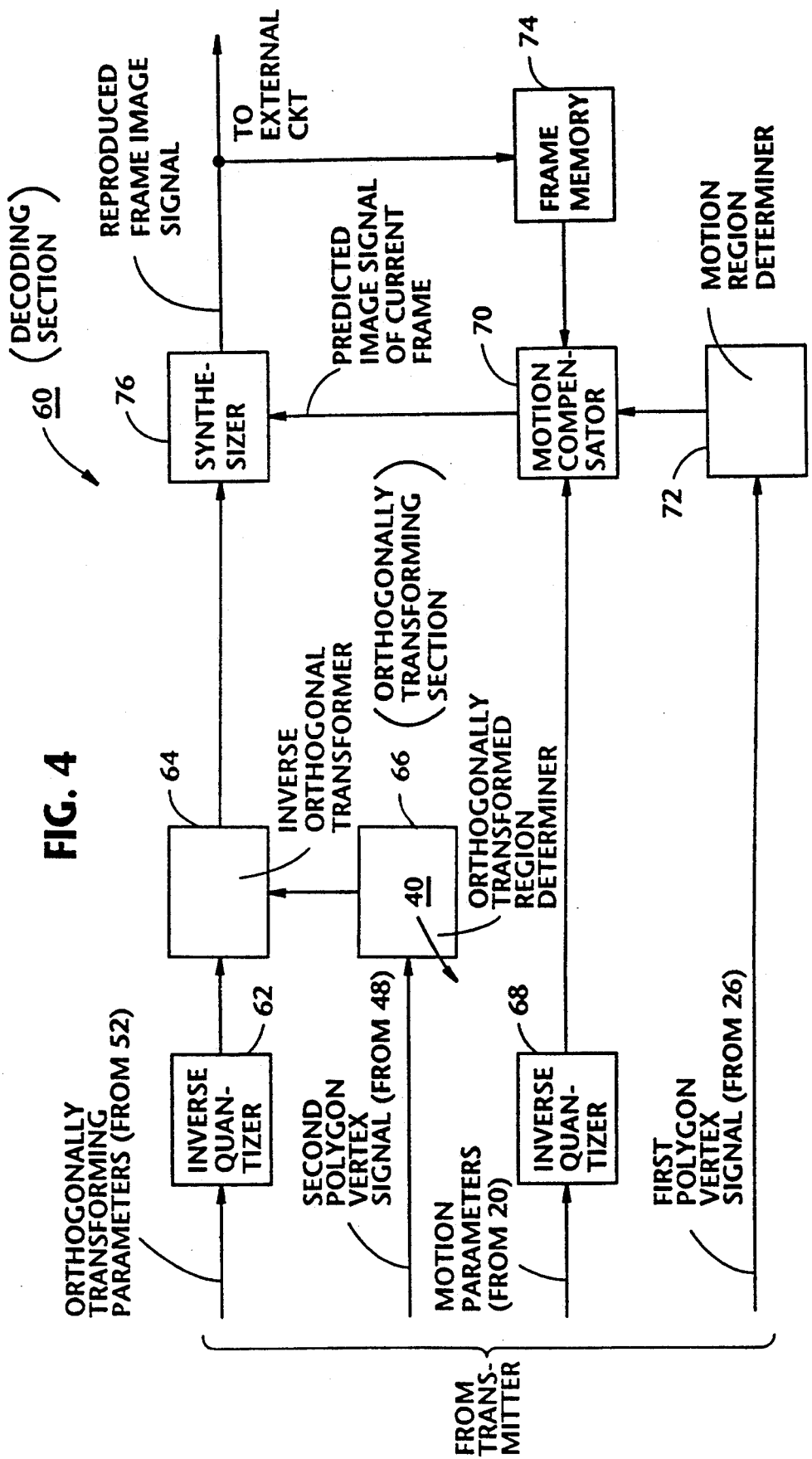
FIG. 4 is a block diagram schematically showing a decoder which reproduces a frame image signal using information applied from the arrangements of FIGS. 1 and 2.

FIG. 4 is a block diagram schematically showing a decoding section (depicted by numeral 60) which is arranged to receive the signal and the parameters which are generated in the arrangements of FIG. 1 and 3. The orthogonally transforming parameters, which are derived from the quantizer 52 (FIG. 3), are applied to an inverse orthogonal transformer 64 after being subject to inverse quantization at an inverse quantizer 62. The second polygon vertex signal obtained at the block 49 (FIG. 3) is applied to an orthogonally transformed region determiner 66 which determines the above mentioned small regions using linear interpolation. The inverse orthogonal transformer 64 produces pixel data within each of the small regions using the information derived from the determiner 66 and the transforming parameters from the block 64.

On the other hand, the motion parameters, outputted from the motion predictor 18 and quantized, are subject to inverse quantization and then applied to a motion compensator 70. Further, the first polygon vertex signal from the block 26. (FIG. 1) is applied to a motion region determiner 72 wherein the motion region is determined using linear interpolation. The motion compensator 70 receives the output of the determiner 72, which approximates the shape to the motion region, and further receives a preceding frame image signal stored in a frame memory 74. Thus, the motion compensator 70 is able to issue a predicted image signal of the current frame therefrom.

The synthesizer 76 receives the outputs of the blocks 64, 70 and reproduces a current frame image signal which is stored in the frame memory 74 as a new preceding frame image signal and is supplied to an appropriate external circuit (not shown).

As mentioned above, a plurality of frame image signals are successively applied to an image signal encoder. A motion region of an incoming frame image signal is extracted and then approximated in shape to a polygon. The vertices of the polygon are determined and then the coordinate values of the vertices are calculated and transmitted. Further, in the event that the incoming image signal includes a region which is required to undergo orthogonal transformation, the region are extracted and then divided into a plurality of small regions. Following, each of the divided small regions is approximated in shape to a polygon and then the vertices thereof are detected. Subsequently, the coordinate values of the vertices are calculated and then transmitted. Consequently, the data to be transmitted can effectively be reduced.

In the above description, the vertices of a polygon are determined but, the present invention is not restricted thereto. As an alternative, the signal indicative of the polygon can be transmitted using any other suitable techniques such as a declination function.

It will be understood that the above disclosure is representative of only one possible embodiment of the present invention and that the concept on which the invention is based is not specifically limited thereto.

What is claimed is:

1. An arrangement of encoding a plurality of image signals successively applied thereto, said arrangement comprising:

first means for storing a first image signal;

second means which is coupled to said first means and extracts a motion region included in a second image signal by comparing said first and second image signals, said second image signal having been applied to said arrangement immediately after said first image signal;

third means which is coupled to said second means and approximates in shape said motion region to a first polygon and extracting vertices of said first polygon and calculating coordinate values of said vertices, said third means generator first information indicative of said coordinates values from said arrangement;

fourth means which is arranged to receive said first and second image signals and a signal indicative of said first polygon, said fourth means generating motion parameters and a predicted image signal, said motion parameters being derived from said arrangement;

fifth means which is arranged to compare said predicted image signal and said second image signal, said fifth means extracting, from said second signal, a first region which is required to be orthogonally transformed;

sixth means which is arranged to receive said first region and said second image signal, said sixth means dividing said first region into a plurality of second regions;

seventh means, coupled to said sixth means, for approximating in shape each of said second regions to second polygons and extracting vertices of each of said second polygons and calculating coordinate values of said vertices of each of said second polygons, said seventh means generating second information indicating said coordinate values of said vertices of each of said second polygons, said second information being derived from said arrangement.

2. An arrangement as claimed in claim 1, wherein said third means includes:

a polygon generator which is coupled to said second means and approximates in shape said motion region to said first polygon; and a polygon vertex and extractor which is coupled to said polygon generator and calculates said vertices of said first polygon, said polygon vertex extractor generating said first information.

3. An arrangement as claimed in claim 1, wherein said seventh means includes:

a polygon generator which is coupled to said fifth means and approximates in shape each of said second regions to be second polygon, said polygon generator generating third information indicative of said second polygon;

a polygon vertex extractor which is coupled to said polygon generator and calculates said vertices of each of said second polygons, said polygon vertex extractor generating said second information.

4. An arrangement as claimed in claim 3, further comprising:

eighth means which is arranged to receive said second image signal and said third information, said eighth means generating an orthogonally transforming parameters from said arrangement.

* * * * *

UNITED STATES PATENT AND TRADEMARK OFFICE
CERTIFICATE OF CORRECTION

PATENT NO. : 5,295,201
DATED : March 15, 1994
INVENTOR(S) : Yutaka Yokoyama

It is certified that error appears in the above-indentified patent and that said Letters Patent is hereby corrected as shown below:

Title page, item [75], inventor: should read -- Yutaka Yokoyama --.
        item [30], Foreign Application Priority Data --insert-
            Jan. 21, 1992 [JP] Japan...........4-8008-- after
            "[22] Filed: Jan. 21, 1993"

Col. 1, line 27, delete "154" and insert --153--;

Col. 2, line 10, delete "firsts" and insert --first--;

Col. 2, line 30, delete "polymens" and insert --polygons--;

Col. 3, line 47, delete "illustrates" and insert --illustrated--;

Col. 3, line 62, delete "26" and insert --46--;

Col. 4, line 5, delete "theroef" and insert --thereof--;

Col. 4, line 28, delete "49" and insert --48--.

Signed and Sealed this

Thirtieth Day of August, 1994

Attest:

BRUCE LEHMAN

*Attesting Officer*      *Commissioner of Patents and Trademarks*